United States Patent [19]

Iwaya et al.

[11] Patent Number: 5,610,111
[45] Date of Patent: Mar. 11, 1997

[54] CERAMIC COMPOSITION FOR THERMISTOR

[75] Inventors: Masaki Iwaya; Kyohei Hayashi, both of Aichi, Japan

[73] Assignee: NGK Spark Plug Co., Ltd., Aichi, Japan

[21] Appl. No.: 345,684

[22] Filed: Nov. 21, 1994

[30] Foreign Application Priority Data

Nov. 25, 1993 [JP] Japan ............................ 5-321428
Dec. 29, 1993 [JP] Japan ............................ 5-350190

[51] Int. Cl.$^6$ .................. C04B 35/42; C04B 35/505
[52] U.S. Cl. .................. 501/136; 252/62.3 T; 338/22 R; 422/82.12
[58] Field of Search ............... 501/136; 252/62.3 T; 338/22 R; 422/82.12

[56] References Cited

U.S. PATENT DOCUMENTS

| | | | |
|---|---|---|---|
| 3,441,517 | 4/1969 | Brauer et al. | 252/520 |
| 3,958,209 | 5/1976 | Soda et al. | 338/22 |
| 4,013,592 | 3/1977 | Matsuoka et al. | 252/521 |
| 4,101,454 | 7/1978 | Kulwicki et al. | 252/514 |
| 5,246,628 | 9/1993 | Jung et al. | 501/136 |
| 5,314,651 | 5/1994 | Kulwicki | 501/136 |
| 5,459,115 | 10/1995 | Kagata et al. | 501/136 |

FOREIGN PATENT DOCUMENTS

| | | |
|---|---|---|
| 48-705 | 1/1973 | Japan . |
| 49-29493 | 3/1974 | Japan . |
| 49-63995 | 6/1974 | Japan . |
| 50-118294 | 9/1975 | Japan . |
| 51-23691 | 2/1976 | Japan . |
| 51-95297 | 8/1976 | Japan . |
| 51-108298 | 9/1976 | Japan . |
| 61-161701 | 7/1986 | Japan . |

OTHER PUBLICATIONS

"Nainenkikan" (Internal Combustion Engine), vol. 30, No. 8, p. 98, (1991) no month available (japanese only).
Patent Abstracts of Japan, vol. 16, No. 420 (E–1259), 4 Sep. 1992 and JP–A–04 144201 (Shinagawa Refract Co Ltd) 18 May 1992, abstract only.

*Primary Examiner*—David Brunsman
*Attorney, Agent, or Firm*—Fish & Richardson P.C.

[57] ABSTRACT

Ceramic composition for thermistor for detecting elevated temperatures which exhibits stable properties at elevated temperatures for permitting use in both oxidizing and reducing atmospheres. In a $YCrO_3$ based material, Sr or Sm is partly or completely substituted for Y, and Fe and Ti are substituted for part of Cr. Such material enables the production of a thermistor element exhibiting practical, low resistance values at 300° to 1100° C. and also exhibiting stability against changes in the environmental conditions or thermal hysteresis. Generally $AMO_3$ perovskite structure (A=2A, 3A,3B subgroup elements, M=4A,5A,6A,8 subgroup elements) having a combination of n-type and p-type components provides the same property, the subgroup being of IUPAC international periodic table. La-free is preferred and sintering aid may be used.

7 Claims, 1 Drawing Sheet

CERAMIC COMPOSITION FOR THERMISTOR

FIELD OF THE INVENTION

This invention relates to a material for thermistor which has high stability at elevated temperatures and which has a negative temperature coefficient so as to be advantageously used at 300° to 1100° C.

BACKGROUND

Among the materials for thermistor usable at elevated temperatures, there have hitherto been employed (a) a material based on a dorundum type crystal structure, mainly composed of $Al_2O_3$ and $Cr_2O_3$, as disclosed for example in JP Patent Kokai Publication JP-A 50-118294, (b) a material based on a spinel type crystal structure, mainly composed of $MgAl_2O_4$, $MgCr_2O_4$ and $MgFe_2O_4$, as disclosed for example in JP Patent Kokai Publication JP-A 49-63995, (c) a material mainly composed of $ZrO_2$, stabilized mainly with $Y_2O_3$ etc., as disclosed for example in "Nainen Kikan" (Internal Combustion Engine), vol. 30, No. 8, page 98, and (d) a material mainly composed of a compound having a perovskite type crystal structure, exhibiting a high melting point and electrical conductivity, such as a material having a $La(Al_{1-x}Cr_x)O_3$ based composition, as disclosed in, for example, JP Patent Kokai Publication JP-A 51-108298, a material having a thin film of $LaCrO_3$ on an insulating substrate, as disclosed for example in JP Patent Kokai Publication JP-A 61-161701, or a material comprising a mixture of $LaCrO_3$ and $MgAl_2O_4$, as disclosed for example in JP Patent Kokai Publications JP-A 51-95297 and JP-A 51-23691.

SUMMARY OF THE DISCLOSURE

Based on eager investigation by the applicant the following has turned out.

However, the corundum type crystal structure based material (a), which may exhibit variable resistance-temperature characteristics by addition of some other element(s), suffers from deterioration in thermal stability etc. on addition of a larger quantity of an additive(s).

The material consisting mainly of the spinel type crystal structure compound (b) has a larger temperature gradient constant ($\beta$) so that it cannot be used over a wide temperature range. The $NiAl_2O_4$ based material (JP Patent Kokai Publication JP-A 49-29493) and $CoAl_2O_4$ based material (JP Patent Kokai Publication JP-A 48-705 and so forth) are low in thermal resistance and cannot be used at elevated temperatures.

The zirconia-based material (c) is unstable in its resistance value under a reducing atmosphere and cannot be put to practical use. On the other hand, the perovskite type crystal structure compound based material (d) suffers from a drawback that, if oxides of La are left in a non-reacted state, non-reacted components tend to be reacted with water contained in atmospheric air to yield labile $La(OH)_3$ to cause the device to collapse or cause unstable resistance values.

In view of the above-described problems, it is an object of the present invention to provide a novel useful ceramic composition.

Particularly, it is a specific object of the present invention to provide a ceramic composition for thermistor in which resistance values over a wide range may be provided by adjusting the composition of material.

It is a still further object to provide a ceramic composition free of hygroscopic substances and being less susceptible to deterioration in characteristics due to environmental humidity or thermal hysteresis.

It is a further object to provide a ceramic composition which can be used over a wide temperature range from ambient temperature up to 1100° C., preferably, with high stability.

Still further objects of the present invention will become apparent in the entire disclosure.

As a result of our eager researches, it has been found that the above problems can be overcome and a satisfactory thermistor may be provided by a ceramic composition for thermistor characterized by a compound represented by a formula $$(Y_{1-x}Sr_x)(Cr_{1-y-z}Fe_yTi_z)O_3 \qquad (I)$$

where x, y and z are $0.351 \geq x \geq 0.01$
$0.4 \geq y/(1-y-z) \geq 0.05$ and
$0.35 \geq z \geq 0.025$.

Also, it has been found that the above problems can be overcome and a satisfactory thermistor may be provided by a ceramic composition for thermistor characterized by compounds represented by a chemical formula $$(Y_{1-x}Sr_x)(Cr_{1-y-z}Fe_yTi_z)O_3 \qquad (II)$$

where x, y and z are the same as in formula (I)
wherein Y (yttrium) may be partly or completely substituted with Sm.

Generally, substitution occurs based on the basic perovskite $YCrO_3$ compound as follows:
(1) For the Y sites of $YCrO_3$, the 3A and 3B subgroup elements and 2A subgroup elements are capable of substitution to form a solid solution, 2A or 3B subgroup elements being within the solubility limits.
(2) For the Cr sites of $YCrO_3$, elements of 4A, 5A, 6A, 7A and 8 subgroups are capable of substitution.

In order to give a n-type component Ti and/or Fe should be present, while Cr, Mn, Co and/or Ni serves to give a p-type component. The proportion between the n-type component and p-type component can be varied in a wide range. Accordingly, it is generally expressed by a formula:

$$AMO_3 \qquad (III)$$

where A represents at least one of 2A, 3A and 3B subgroup elements, and M at least one of subgroups 4A, 5A, 8A, 7A and 8.

Typically, Y (yttrium) represents the "A" sites and any one of other elements of 3A or 3B subgroup elements can be substituted for Y, partially or entirely.

Typically Sr is representative as an element belonging to the 2A subgroup elements which are capable of assuming the A sites, i.e., (substituting for Y) only partially, i.e., within the solubility limits.

It is significant that, e.g., the group of $Fe^{3+}$, $Cr^{3+}$, $Mn^{3+}$ and the 3A subgroup elements are mutually solid-soluble in the $AMO_3$ ($YCrO_3$) system. The same applies for the group of $Ti^{4+}$ and the 2A subgroup elements.

Note that, in this application the subgroup nomination A, B is based on the international periodic table defined by IUPAC, 1970.

The temperature property (stability against increasing temperatures) varies depending on the proportion between the p-type and n-type components in the $AMO_3$ system, and can be adjusted upon necessity.

Particular stability is observed in the $Y(Cr,Fe)O_3$ system or generally $A(Cr,Fe)O_3$ system (IV) within a Fe/Cr ratio of 0.05 to 0.4. In this system, Cr may be replaced by Mn, Co and/or Ni, whereas Fe may be partially or entirely replaced by Ti for giving the n-type component.

Among the lanthanoid series elements (atomic number 57La to 71Lu) which belong to the 3A subgroup, La is apt to yield labile lanthanum hydroxide through reaction of nonreacted La components with water, e.g., in the ambient air. Therefore, care should be taken if La is present so as not to leave unreacted La, i.e., undissolved La in the solid-solution of the basic AMOs system. Even with the presence of La or La-containing phases, the $AMO_3$ system can be stable against the temperature change for giving desired values of resistance etc. based on the basic mechanism of the p-type and n-type combination occurring in the sole solid-solution phase (matrix). However, nonpresence of La would be preferred in view of excluding the deterioration.

The inventive ceramic composition consists essentially of the sole solid-solution matrix phase of the $AMO_3$ system with a minor presence of the grain boundary phase(s) originating from the sintering aid.

If the solubility limits are exceeded for certain substitution elements, there is possible occurrence of a further phase or phases, however, which are unpreferred. Such further phase would be allowed to be present only within a limited extent such that it not adversely affect the essential property of the basic $AMO_3$ system.

More particularly, there is provided a ceramic composition for thermistor characterized by a compound represented by a chemical formula $$(Y_{1-x}Q_x)(Cr_{1-y-z}Fe_yTi_z)O_3 \quad (V)$$

where Q is at least one selected from 2A, 3A and 3B subgroup elements according to the international periodic table of IUPAC, and where x, y and z are $0.351 \geq x \geq 0.01$, $0.4 \geq y/(1-y-z) \geq 0.05$ and $0.35 \geq z \geq 0.025$.

Also there is provided a ceramic composition for thermistor characterized by a compound represented by a chemical formula $$\{(Y_{1-w}RE_w)_{1-x}Qx\}\{Cr_{1-y-z}Fe_yTi_z\}O_3 \quad (VI)$$

where Q is at least one selected from the 2A subgroup elements and RE is at least one element selected from the lanthanide series elements, and where w, x, y and z are $1.0 \geq w > 0$, $0.351 \geq x \geq 0.01$, $0.4 \geq y/(1-y-z) \geq 0.05$, and $0.35 \geq z \geq 0.025$.

In the lanthanoid series elements, lanthanide (i.e., except La) elements are preferred. However, La may be present, if the thermistor element is used in the condition freed of water.

As the Q elements, 3A, 3B and 2A subgroup elements are counted.

As the 3A elements, Sm, Pt, Nd, Mo, Dy, Er, Gd, Yb, etc. (particularly Sm), generally rare earth elements or lanthanoid series elements of atomic number 57–71, are counted.

As the 3B elements Al, etc. are counted. As the 2A subgroup elements Mg, Ca, St, Ba, etc. (particularly St) are counted. Among the lanthanoid series elements, La is unpreferred where the stability against $H_2O$ is required.

DESCRIPTION OF THE PREFERRED EMBODIMENTS

Above all, or more preferably, an element having high strength and capable of being sintered at lower temperatures can be provided by adding sintering aids to the above ceramic composition for thermistor to improve its sinterability.

As the sintering aids, those capable of producing a liquidus phase in the grain boundary to form a matrix for improving sinterability of the ceramics are employable, and silica, mullite, calcium silicate ($CaSiO_3$), strontium silicate ($SrSiO_3$), etc. are preferred. The sintering aids are preferably used in an amount of 0.5 to 10% by weight, most preferably 0.8 to 5% by weight, usually resulting in a boundary phase (e.g., glass phase) of the perovskite grains as a matrix phase.

Further, it is preferred to apply aging to further stabilize the resistance value, wherein the aging is done preferably at 1000° to 1200° C. for 100 to 300 hours in ambient air.

The material for the thermistor according to the present invention is of the perovskite structure and hence it is possible for atoms having approximate ionic radii to substitute with each other easily. Consequently, the resistance values or temperature coefficients (β) of resistance values can be adjusted over a wide range by adjusting the compositional ratio continuously over a wide range.

So long as the composition is free of La, there is no such adverse effect as deterioration due to moisture absorption etc. The composition is also superior in high temperature stability and can be stably used for a prolonged period of time at temperatures of 300° C. or higher.

The ceramic composition for the thermistor according to the present invention comprises a mixture of a p-type semiconductor and an n-type semiconductor, such that lattice defects of oxygen or metal ions which are labile against heat are reduced, and hence a thermistor element can be provided which undergoes little change in the resistance when subjected to the heat hysteresis.

On the other hand, since the oxygen partial pressure dependency of the p-type semiconductor is reversed from that of the n-type semiconductor, mixing the two results in their characteristics cancelling each other to provide characteristics stable against the oxygen partial pressure. Consequently, any adverse effect caused by the oxygen partial pressure in atmospheric air is reduced and hence the thermistor element as an ultimate product may extensively used as a sensor for cars by being built into a metal tube.

It is preferred according to the present invention to have a ceramic composition which can detect a wide temperature range, particularly preferred are those having a resistance value of 1 Mohm or less within a range of 300°–900° C.

As for the composition, it is generally preferred to have those which yield as little as an amount of by-product phases other than the aimed single phased solid solution. The compositional range of $0.4 \geq y/(1-y-z) \geq 0.05$ is selected in view of the temperature resistant property. A compositional range of $0.1 \geq z \geq 0.05$ is preferred in view of reduced yielding of by-products. A compositional range of $0.15 \geq x \geq 0.01$ is further preferred in order to achieve a reduced difference in the resistance value after thermal hysteresis. It is assumed outside the above range for z, it might happen to exceed a solubility limit for solid solution, which might result in a two-phases system giving rise to a tendency of certain reduction in the stability.

As for the substitution for Y (yttrium) based on the $YCrO_3$, generally speaking, the Y site can be substituted with 3A subgroup elements (Sc and lanthanoid series elements of atomic number of 57 to 71, e.g., La, Pr, Nd, Sm, Ho, Dy, Er, Gd, Yb, etc.). 3B subgroup elements (Al, etc.) or 2A subgroup (Mg, Ca, Sr, Ba, etc.) or mixtures thereof. Among the lanthanoid series, La is unpreferred for the reason of yielding labile hydroxide, as previously explained. The solubility limit depends on the ionic radius. Those having a stable balance number are preferred for better stability. Y has an ion radius of 0.09 nm, whereas the ion radius of other elements ranges from 0.072 nm (Mg) to 0.135 nm (Ba).

The Cr site in the perovskite $YCrO_3$ system can be substituted with at least any one of elements of subgroups 4A (Ti, Zr, Hf), 5A (V, Nb, Ta), 8A (Cr, Mo, W); 7A (Mn, etc.) and 8 (Fe, Co, Ni, etc.), preferably at least one elements selected from Mn, Co, Ni, Fe and Ti provided that the amount is within the solubility limit. Therefore, any one of elements of the subgroups 4A, 5a, 8A, 7A and 8 other than Fe and Ti can be further present within the solubility limit replacing the elements Fe and/or Ti, for substituting the Cr site in the $YCrO_3$ system.

According to the present invention, generally, it is aimed at a combination of the p-type and n-type components. For the p-type components (compounds) based on the $YCrO_3$ system those elements Cr, Mn, Co and Ni are preferred, whereas for the n-type components (compounds) the elements Ti and Fe.

This fact provides a further possibility of substitution as follows:

(1) $Fe^{3+}$, $Cr^{3+}$, $Mn^{3+}$ etc. and the 3A subgroup elements are capable of forming solid solution each other based on $YCrO_3$, and Cr, $Ti^{4+}$ and 2A subgroup elements are likewise capable of forming solid solution each other within the solubility limits.

The temperature property (stability against increasing temperature) depends on the ratio between the p-type and n-type. Particularly, a ratio of $0.05 \leq Fe/Cr \leq 0.4$ in the $Y(Cr, Fe)O_3$ system or $A(Cr,Fe)O_3$ or generally $AMO_3$ system provides a high stability against heat, thus this ratio is preferred.

Generally, the ceramic composition for thermistor and the thermistor elements according to the invention may be produced by preparing a starting material mixture, molding and sintering. The preparation of the starting material mixture preferably comprises calcination and/or granulation.

The preparation of the starting material mixture may be carried out, e.g., weighing and mixing raw materials, drying the resulting slurry, calcining the dried mass followed by granulation. The granulation may be carried out by pulverizing the calcined mass, preferably to a grain size of about one micrometer optionally added with a binder (usually organic) for subsequent granulation and molding, the resulting slurry is dried and followed by granulating, which may be done by spray drying or freeze-drying to provide a granular starting material mixture for sintering. The starting material mixture is molded and sintered to produce a dense sintered ceramic body, typically about 1550° C. for one hour in ambient air.

The calcination is carried out at a temperature sufficient to produce a desired intermediate component (i.e., solid solution) at a temperature such that would not cause excess densification so as to provide no difficulty in subsequent pulverization. Preferably the calcination is carried out at about 1400° C. for about 2 hours, e.g., in a crucible of alumina.

The molding may be carried out using a die or mold usually by cold pressing, however, any other molding methods. can be applied.

The sintering can be carried out typically (as a standard) at 1550° C. for one hour in ambient air, the sintering temperature ranging 1400° to 1600° C., preferably 1500° to 1570° C. for a period of time to become sufficiently dense. The sintering time depends on the shape and size of desired products, and a half hour to 4 hours, preferably up to 2 hours, would be preferred for a size as exemplified herein.

The sintering can be made in the ambient air, however, a further reduction in variation of the resistance values can be achieved by sintering it in a ceramic box (e.g., alumina ceramic or magnesia ceramic) in the case where the composition comprises those elements or substance which are apt to vaporize at a high temperature during the sintering, e.g., Cr. etc. This is because an atmosphere of a volatile substance is produced in the box, i.e., surrounding the mass to be sintered, which would suppress the vaporization. Also, the inner wall of the box may be coated with the substance per se which are apt to vaporize. Alternatively, a non sintered green product may be placed in a box beforehand and preheated to provide deposition of easily vaporized component in the raw materials for the thermistor composition on the inner wall of the box, which box is used for further sintering.

In the following, certain preferred conditions for production will be mentioned.

The raw materials are mixed preferably using a ball mill, for a sufficient period of time, e.g., 15 hours for uniform mixing. It is preferred to use balls and/or pot of (a) $ZrO_2$ or silicon nitride, or (b) PTFE (polytetrafluoroethylene) or polyamide type resine (e.g., Nylon, trade name), in order to avoid contamination.

Drying of the slurry should be carried out without separation of ingredients caused by the difference in the specific gravity, and thus spray drying or freeze drying is preferred.

The sintering is carried out preferably in an electric furnace, however, other furnaces may be used.

The pulverization following to the calcination may be carried out substantially in the same manner as the mixing of the raw materials, whereas drying of the resulting slurry may be carried out in the same manner as that follows the mixing of the raw materials, provided that a binder (organic, PVA, etc.) and a dispersing agent may be admixed before spraying.

The granulation may be carried out by spray drying added with a binder and a dispersing agent to make granules having a good flowability. The granulation may be also carried out by freeze drying.

The mixing conditions hereinabove mentioned generally relate to the case where powdery raw materials are used. Instead, aqueous solutions of metal elements which form oxides concerned, respectively, may be partly or entirely used as the raw materials. In such a case, aqueous solutions may be, e.g.,, nitrate solutions, e.g., $Fe(NO_3)_2$, $Cr(NO_3)_2$, $Sr(NO_3)_3$, etc., wherein e.g., precipitation or co-precipitation, thermal decomposition and sol-gel method etc. may be employed.

In summary the following meritorious effects are achieved by the present invention.

Thermistor elements could be provided which are to a less extent susceptible to changes in the temperature and resistance characteristics when used in a wider temperature range and which may be practically used with a stable resistance value against the thermal hysteresis. Consequently, a ceramic composition for thermistor could be provided which is superior in mechanical strength and hence is usable as a measurement unit for measuring the temperature of hot gases such as, e.g., an overheat sensor of catalysts for purifying automotive engine exhaust gases, a gas temperature of recirculated gases from an exhaust gas recirculation system etc., a measurement unit mounted at a position susceptible to severe vibrations, or a temperature sensor for various furnaces.

In the following, the present invention will be described in more detail with reference to the drawings and example.

Figure 1:
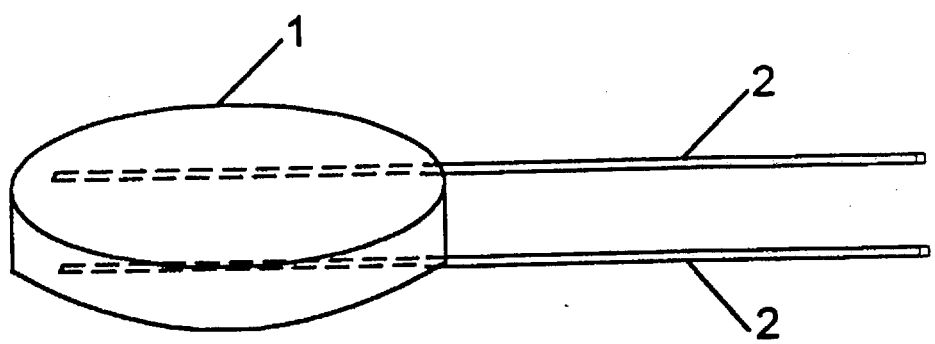
FIG. 1 shows an embodiment of the present invention.

Explanation of Numerals
1 . . . thermistor element;
2 . . . lead

EXAMPLES

Example 1

A first embodiment of the present invention is now explained.

First of all, $Y_2O_3$, having a purity of not lower than 99.9% and a mean particle size of 1 µm, $SrCO_3$ having a purity of not lower than 98.5% and a mean particle size of not more than 1 µm, $Cr_2O_3$ having a purity of not lower than 98.5% and a mean particle size of not more than 1 µm, $Fe_2O_3$ having a purity of not lower than 98.5% and a mean particle size of not more than 1 µm, and $TiO_2$ having a purity of not lower than 98.5% and a mean particle size of not more than 1 µm, were weighed so as to give ratios of x, y, and z shown at the column of "composition" in Table 1 under the formula $(Y_{1-y}Sr_x)(Cr_{1-y-z}Fe_yTi_z)O_3$, wet mixed in a PTFE pot with balls coated with PTFE on steel balls for 15 hours using ion-exchanged water, dried by freeze-drying at –40° C. followed by evacuation to 13.3–26.6 Pa (0.1–0.2 Torr) and subsequent sublimation at 30° C., and subsequently calcined at 1400° C. for two hours in an $Al_2O_3$ crucible. The calcined powders were admixed with 1 wt % of $SiO_2$ powders having a mean particle size of 0.6 µm, and wet mixed together using ion-exchanged water in a PTFE pot with $Si_3N_4$ balls for 15 hours. The resulting slurry was passed through a 200 mesh sieve and dried by freeze-drying as mentioned above. After drying, a binder composed of 15 wt % of PVB, 10 wt % of DBP, 50 wt % of MEK and 25 wt % of toluene was dispersed in acetone and added to the dried product and the resulting mixture was granulated followed by drying to produce powders for press molding having a grain size of 100 to 355 micrometers.

In Table 1, Sample numbers 1, 3, 17 and 33 stand for Comparative Examples.

The powders were charged into a metal die in which two platinum wires of 0.4 mm in diameter were disposed parallel to each other at equal distances from the center of the die with a distance of 1.2 mm from each other, as leads, and pressed under a pressure of 98 MPa (1000 kg/cm²), to produce molded compacts having a diameter of 3 mm and a thickness of 2 mm and having two leads embedded therein. The molded compacts were sintered in atmospheric air at 1550° C. for one hour to produce thermistor elements. Further, aging was applied to Samples Nos. 2, 4, 5 and 6 by retaining them at 1100° C. in ambient air for 200 hours.

Of the thermistor elements, thus produced, resistance values at 300° C., 350° C., 500° C. and 900° C. in the atmospheric air were measured. The results are also shown in Table 1.

The samples were then held at 1000° C. for 300 hours in atmospheric air and resistance values thereof were measured at 300° C., 350° C., 500° C. and 900° C. before and after holding at 1000° C. in order to scrutinize durability characteristics thereof. The results are shown in Table 2.

In Table 1, β indicates the temperature coefficient of the resistance value represented by $$\beta = \ln(R/Ro)/(1/K - 1/Ko)$$

whereas the ΔR ratio in Table 2 indicates the rate of change of the resistance value represented by $$\Delta R\ ratio = (Rt - Ro)/Ro \times 100\%$$

wherein ln denotes .common logarithm, R and Ro represent resistance values in atmospheric air at absolute temperatures K and Ko, respectively, Rt represents a resistance value at an absolute temperature Kt (t=300° C., 350° C., 500° C. or 900° C.) following a durability test. In Table 1, 300–500 and 500–900 denote the values for β for temperature ranges of 300° C. to 500° C. and 500° to 900° C., respectively.

Table 2 shows the values of the ΔR ratio, calculated as temperature. These values are defined by the equation:

$$\text{(value of } \Delta R \text{ ratio calculated as temperature)} = \beta \times Ko/[\ln(Rt/Ro) \times Ko + \beta] - Ko$$

Also sample Nos. 7, 8, 12, 23, 24, 25 and 27 were allowed to stand in atmospheric air at 1100° C. for two hours, and the resistance values before and after allowing to stand in atmospheric air were measured for conducting a high temperature durability test. Favorable results could be obtained for these samples as the value of ΔR ratio calculated as temperature remained within 15° C.

It is evident from Table 1 that the resistance value can be adjusted to a great extent by selecting mixing proportions of each of elements in the composition represented by the formula $(Y_{1-x}Sr_x)(Cr_{1-y-z}Fe_yTi_z)O_3$.

Also, by products are produced in small amounts as the inventive ceramic composition is essentially composed of a substance resulting from a simple substitution solid solution reaction. Particularly, the by-products are not observed at an amount of Sr substitution of 30% or less as the ceramic composition results only from the simple substitution solid solution reaction. The latter composition can be sintered at a temperature of 1600° C. or less thereby avoiding deterioration of leads embedded in the thermistor elements as well as providing a high mechanical strength.

It is also seen from Table 1 that the samples having compositions in which the amount of Y substitution relative to Sr is 1 to 35.1 mol %, the ratio of Fe substitution relative to Cr (Fe/Cr) is 0.05 to 0.40 and the amount of Ti substitution is 2.5 to 35 mol % has the resistance values falling in a practically acceptable range for a temperature range of 300° to 900° C. Besides, as for the durability, the ΔR ratio is small and the ΔR ratio calculated as temperature is also small, so that the samples represent a thermistor material advantageously employed in a temperature range of 300° to 1000° C.

If the amount of substitution of any one of Sr, Fe and Ti is small (sample Nos. 1, 3 and 17) or the amount of substitution of Sr or Ti is larger (sample No. 33), the ΔR ratio calculated as temperature is changed by a temperature exceeding 15° C. Thus, these samples may be said unsuitable for the use at a temperature higher than 500° C. in view of the durability.

The results of the durability test indicate that the ceramic composition for thermistor according to the present invention shows extremely stable properties with respect to the thermal hysteresis.

This is presumed to be ascribable to the fact that, since the ceramic composition of the present invention is a mixture of $YCrO_3$, a p-type semiconductor, and $Fe_2O_3$, an n-type semiconductor, oxygen ion defects or metal ion defects which are labile against thermal hysteresis are reduced in their quantities.

If the amount of Ti substitution is reduced to less than 2.5%, the resulting composition becomes slightly inferior in sinterability.

Example 2

The same starting materials as those used in Example 1 and $Sm_2O_3$ having a purity not lower than 99.9% and a mean particle size of not more than 1 μm were weighed to give compositions shown in Table 3. Samples were prepared by a method similar to that of Example 1, and the resistance values as well as durability of the resulting thermistor elements were measured. The results are shown in Tables 3 and 4.

It is seen from Tables 3 and 4 that a composition produced by substituting Sm for Y in the composition represented by the chemical formula $\{(Y_{1-w}Sm_w)_{1-x}Sr_x\}\{Cr_{1-y-z}Fe_yTi_z\}O_3$ has a reduced resistance value and represents a material for thermistor element which is suitable for the use at lower temperatures and has a superior durability. Further, high temperature durability tests were conducted on Samples Nos. 42 and 43 by measuring resistance before and after holding the Samples in ambient air at 1100° C. for 2 hours. The results demonstrated good values of the ΔR ratio calculated as temperature all falling within 15° C.

Based on this Example, it turned out that the present invention can provide thermistor elements which suffer little changes in the temperature and resistance characteristics even when used in a temperature range of 300° to 1100° C. and thus which may be practically used with a stable resistance value against the thermal hysteresis.

It should be note that modification obvious in the art can be made without departing from the gist and scope of the present invention as herein disclosed and claimed in the appended claims.

TABLE 1

| sample | composition | | | resistance values (K Ω) | | | | β | |
|---|---|---|---|---|---|---|---|---|---|
| No. | x | y | z | 300° C. | 350° C. | 500° C. | 900° C. | 300–500 | 500–900 |
| 1 | 0.0 | 0.19 | 0.05 | 37.0 | 18.7 | 4.14 | 0.398 | 4851 | 5312 |
| 2 | 0.01 | 0.19 | 0.05 | 42.5 | 21.6 | 4.71 | 0.436 | 4872 | 5395 |
| 3 | 0.011 | 0.198 | 0.01 | 11436 | 3084 | 119 | 0.380 | 10109 | 13029 |
| 4 | 0.011 | 0.219 | 0.05 | 5.74 | 3.271 | 0.926 | 0.140 | 4390 | 4283 |
| 5 | 0.014 | 0.271 | 0.05 | 14.5 | 7.989 | 2.052 | 0.254 | 4324 | 4736 |
| 6 | 0.018 | 0.19 | 0.05 | 95.3 | 45.4 | 8.29 | 0.490 | 5410 | 6408 |
| 7 | 0.026 | 0.195 | 0.025 | 13633 | 2965 | 67.1 | 0.225 | 11769 | 12916 |
| 8 | 0.029 | 0.19 | 0.05 | 2914 | 812 | 47.2 | 0.630 | 9131 | 9785 |
| 9 | 0.037 | 0.19 | 0.05 | 17223 | 7279 | 147 | 0.527 | 10551 | 12763 |
| 10 | 0.046 | 0.19 | 0.05 | 18546 | 6436 | 104 | 0.348 | 11482 | 12919 |
| 11 | 0.049 | 0.19 | 0.05 | 13435 | 4417 | 68.0 | 0.263 | 11706 | 12593 |
| 12 | 0.05 | 0.19 | 0.05 | 10660 | 2160 | 49.2 | 0.208 | 11911 | 12391 |
| 13 | 0.051 | 0.19 | 0.05 | 10450 | 2333 | 60.2 | 0.235 | 11420 | 12571 |
| 14 | 0.051 | 0.158 | 0.05 | 10670 | 2216 | 51.2 | 0.198 | 11825 | 12593 |
| 15 | 0.051 | 0.124 | 0.05 | 8144 | 1735 | 41.8 | 0.179 | 11676 | 12374 |
| 16 | 0.051 | 0.045 | 0.05 | 1846 | 440 | 14.4 | 0.132 | 10746 | 10639 |
| 17 | 0.051 | 0.00 | 0.05 | 5.28 | 2.48 | 0.485 | 0.065 | 5288 | 4549 |
| 18 | 0.052 | 0.19 | 0.05 | 12007 | 2567 | 62.3 | 0.234 | 11652 | 12659 |
| 19 | 0.054 | 0.19 | 0.05 | 9641 | 2144 | 54.9 | 0.219 | 11446 | 12522 |
| 20 | 0.059 | 0.19 | 0.05 | 3535 | 874 | 27.8 | 0.155 | 10731 | 11763 |
| 21 | 0.063 | 0.19 | 0.05 | 723 | 221 | 11.4 | 0.102 | 9190 | 10691 |
| 22 | 0.067 | 0.19 | 0.05 | 226 | 78 | 5.43 | 0.076 | 8259 | 9675 |
| 23 | 0.069 | 0.271 | 0.05 | 439 | 136 | 7.702 | 0.095 | 8952 | 9963 |
| 24 | 0.07 | 0.219 | 0.05 | 52.9 | 21.9 | 2.274 | 0.061 | 6972 | 8202 |
| 25 | 0.071 | 0.19 | 0.05 | 19.5 | 9.64 | 1.55 | 0.055 | 5604 | 7558 |
| 26 | 0.101 | 0.18 | 0.10 | 1593 | 421 | 16.3 | 0.135 | 10148 | 10866 |
| 27 | 0.151 | 0.17 | 0.15 | 2252 | 522 | 16.9 | 0.137 | 10832 | 10918 |
| 28 | 0.154 | 0.111 | 0.15 | 706 | 174 | 7.24 | 0.102 | 10144 | 9661 |
| 29 | 0.201 | 0.16 | 0.20 | 1243 | 324 | 12.8 | 0.131 | 10134 | 10387 |
| 30 | 0.251 | 0.15 | 0.25 | 832 | 240 | 11.2 | 0.129 | 9541 | 10119 |
| 31 | 0.301 | 0.14 | 0.30 | 319 | 117 | 8.08 | 0.130 | 8141 | 9361 |
| 32 | 0.351 | 0.13 | 0.35 | 138 | 59. | 5.96 | 0.126 | 6957 | 8744 |
| 33 | 0.401 | 0.12 | 0.40 | 52.8 | 25. | 3.69 | 0.115 | 5881 | 7860 |

TABLE 2

| sample No. | ΔR ratio % | | | | value of ΔR ratio calculated as temperature (°C.) | | | |
|---|---|---|---|---|---|---|---|---|
| | 300° C. | 350° C. | 500° C. | 900° C. | 300° C. | 350° C. | 500° C. | 900° C. |
| 1 | 19.6 | 15.9 | 18.7 | 8.0 | −12 | −12 | −19 | −20 |
| 2 | 15.0 | 12.5 | 10.8 | 4.6 | −9 | −9 | −11 | −11 |
| 3 | 45.0 | 30.5 | 26.3 | 16.8 | −12 | −10 | −11 | −16 |
| 4 | 12.5 | 5.5 | 5.7 | 3.0 | −9 | −5 | −8 | −9 |
| 5 | 13.0 | 11.3 | 7.5 | 3.0 | −9 | −9 | −9 | −9 |
| 6 | 10.0 | 12.3 | 14.5 | 5.5 | −6 | −8 | −12 | −11 |
| 7 | 2.9 | 4.5 | 5.0 | 3.5 | −1 | −1 | −2 | −4 |
| 8 | 15.6 | 13.6 | 13.2 | 5.6 | −5 | −5 | −7 | −8 |
| 9 | −3.6 | −4.7 | −2.4 | −1.4 | 1 | 2 | 1 | 2 |
| 10 | 9.0 | 6.0 | −2.7 | −2.7 | −2 | −2 | 1 | 3 |
| 11 | 3.9 | 4.0 | −2.1 | −3.8 | −1 | −1 | 1 | 4 |
| 12 | 0.6 | 0.2 | −2.5 | −2.0 | 0 | 0 | 1 | 2 |
| 13 | 1.8 | 1.6 | 0.3 | 1.8 | −1 | −1 | 0 | −2 |
| 14 | 4.4 | 0.5 | −0.6 | −0.5 | −1 | 0 | 0 | 1 |
| 15 | 5.3 | 0.8 | −0.8 | −2.2 | −1 | 0 | 0 | 2 |
| 16 | −9.1 | −11.0 | −9.1 | −7.8 | 3 | 4 | 5 | 11 |
| 17 | −29.8 | −29.3 | −32.1 | −9.5 | 23 | 27 | 54 | 31 |
| 18 | 0.9 | 1.3 | 0.5 | 1.3 | 0 | 0 | 0 | −1 |
| 19 | 8.7 | 5.1 | 3.7 | 4.7 | −2 | −2 | −2 | −5 |
| 20 | 5.9 | 5.1 | 6.6 | 4.6 | −2 | −2 | −3 | −5 |
| 21 | 2.3 | 5.4 | 7.7 | −1.0 | −1 | −2 | −4 | 1 |
| 22 | 2.1 | 2.5 | 5.8 | 0.0 | −1 | −1 | −3 | 0 |
| 23 | 9.5 | 9.6 | 8.2 | 4.5 | −3 | −4 | −5 | −6 |
| 24 | 2.6 | 2.6 | 3.5 | 5.7 | −1 | −1 | −2 | −9 |
| 25 | −9.0 | −8.5 | −4.7 | 5.0 | 6 | 6 | 4 | −9 |
| 26 | −1.6 | 7.2 | 6.4 | 5.7 | 1 | −3 | −3 | −7 |
| 27 | −10.2 | 1.3 | 0.8 | 2.3 | 3 | 0 | 0 | −3 |
| 28 | −10.3 | 2.2 | 2.5 | 2.4 | 4 | −1 | −2 | −3 |
| 29 | −14.6 | −10.4 | −7.0 | −0.8 | 5 | 4 | 4 | 1 |
| 30 | −19.8 | −17.7 | −11.4 | −3.3 | 8 | 8 | 7 | 5 |
| 31 | −25.2 | −22.9 | −14.7 | −5.1 | 12 | 13 | 10 | 8 |
| 32 | −20.5 | −22.0 | −12.1 | −6.0 | 11 | 14 | 9 | 10 |
| 33 | −30.0 | −25.2 | −20.0 | −12.0 | 21 | 20 | 17 | 23 |

TABLE 3

| sample No. | composition | | | | resistance values (K Ω) | | | | β | |
|---|---|---|---|---|---|---|---|---|---|---|
| | w | x | y | z | 300° C. | 350° C. | 500° C. | 900° C. | 300–500 | 500–900 |
| 41 | 1.0 | 0.051 | 0.19 | 0.05 | 12.7 | 3.74 | 0.299 | 0.023 | 8303 | 5814 |
| 42 | 1.0 | 0.054 | 0.19 | 0.05 | 21.9 | 6.41 | 0.471 | 0.026 | 8503 | 6566 |
| 43 | 0.50 | 0.054 | 0.19 | 0.05 | 188 | 50.8 | 2.331 | 0.046 | 9723 | 8898 |
| 44 | 0.20 | 0.054 | 0.19 | 0.05 | 1341 | 301 | 9.173 | 0.082 | 11041 | 10693 |
| 45 | 0.10 | 0.054 | 0.19 | 0.05 | 3519 | 752 | 19.8 | 0.121 | 11472 | 11555 |

TABLE 4

| sample No. | ΔR ratio (%) | | | | value of ΔR ratio calculated as temperature (°C.) | | | |
|---|---|---|---|---|---|---|---|---|
| | 300° C. | 350° C. | 500° C. | 900° C. | 300° C. | 350° C. | 500° C. | 900° C. |
| 41 | −11.8 | −13.8 | −9.0 | −3.2 | 5 | 7 | 10 | 8 |
| 42 | −8.9 | −2.9 | −3.0 | 0 | 4 | 1 | 3 | 0 |
| 43 | 4.8 | 6.0 | 2.9 | 0 | −2 | −2 | −2 | 0 |
| 44 | −4.7 | −2.4 | 0.5 | −3.0 | 1 | 1 | 0 | 4 |
| 45 | 6.1 | 8.3 | 7.5 | 3.8 | −2 | −3 | −4 | −4 |

What is claimed is:

1. A ceramic composition for a thermistor comprising a compound represented by a chemical formula $$(Y_{1-x}Sr_x)(Cr_{1-y-z}Fe_yTi_z)O_3$$

where $0.351 \geq x \geq 0.01$,
$0.4 \geq y/(1-y-z) \geq 0.05$, and
$0.35 \geq z \geq 0.025$.

2. A ceramic composition for a thermistor comprising a compound represented by a chemical formula $$\{(Y_{1-w}Sm_w)_{1-x}Sr_x\}\{Cr_{1-y-z}Fe_yTi_z\}O_3$$

where $1.0 \geq w > 0$,
$0.351 \geq x \geq 0.01$,
$0.4 \geq y/(1-y-z) \geq 0.05$, and
$0.35 \geq z \geq 0.025$.

3. The ceramic composition as defined in claim 1, wherein said ceramic composition further comprises a phase resulting from a sintering aid, said sintering aid being in an amount of 0.5 to 10% by weight of the entire composition.

4. The ceramic composition as defined in claim 3, wherein said sintering aid is selected from the group consisting of silica, mullite, calcium silicate and strontium silicate.

5. The ceramic composition as defined in claim 3, wherein said sintering aid is silica.

6. A thermistor element comprising the ceramic composition as defined in claim 2.

7. An apparatus for measuring temperature comprising a thermistor element comprising the ceramic composition as defined in claim 2.

* * * * *